United States Patent [19]
Kojima

[11] Patent Number: 4,991,130
[45] Date of Patent: Feb. 5, 1991

[54] NORMALIZATION CONTROL SYSTEM FOR FLOATING POINT ARITHMETIC OPERATION

[75] Inventor: Shingo Kojima, Tokyo, Japan
[73] Assignee: NEC Corporation, Tokyo, Japan
[21] Appl. No.: 356,457
[22] Filed: May 25, 1989

[30] Foreign Application Priority Data
May 25, 1988 [JP] Japan ................... 63-128843

[51] Int. Cl.⁵ ............................................. G06F 15/00
[52] U.S. Cl. ............................................. 364/715.04
[58] Field of Search ................ 364/715.04, 748, 200

[56] References Cited
U.S. PATENT DOCUMENTS

| | | | |
|---|---|---|---|
| 4,412,283 | 10/1983 | Mor et al. | 364/200 |
| 4,573,118 | 2/1986 | Damouny et al. | 364/200 |
| 4,713,750 | 12/1987 | Damouny et al. | 364/200 |
| 4,773,035 | 9/1988 | Lee et al. | 364/748 |

*Primary Examiner*—Gary V. Harkcom
*Assistant Examiner*—Tan V. Mai
*Attorney, Agent, or Firm*—Foley & Lardner, Schwartz, Jeffery, Schwaab, Mack, Blumenthal & Evans

[57] ABSTRACT

A microprogram controlled microprocessor capable of normalizing a given data in a floating point representation includes a memory storing a microprogram, an address register for holding a microprogram start address, an operand register for holding a source operand, a temporary register for temporarily holding an operation data, a pointer for holding a code indicative of the operand register at the time of starting the microprogram and for indicating a transfer source register in a transfer operation between internal registers, and a discriminator for discriminating whether or not an input source operand is a normalized number. The microprocessor operates on the basis of the microprogram to execute a given operation to the input source operand while causing the discriminator to discriminate whether or not the input source operand is a normalized number, so that the microprogram is completed without a branch when the input source operand is a normalized number. On the other hand, when the input source operand is an unnormalized number, the microprocessor operates to branch to a normalizing program and to cause a normalized operand to be held in the temporary register and a code indicative of the temporary register to be set to the pointer. In addition, the microprocessor operates to re-execute the microprogram from the address designated by the address register.

2 Claims, 14 Drawing Sheets

FIGURE 5   PRIOR ART

| KIND OF INSTRUCTIONS (CLASSIFIED BY FIELDS) | | MNEMONIC | CONTENT |
|---|---|---|---|
| TRANSFER INSTRUCTION (DESIGNATION OF REGISTER) | | AREG | DESIGNATE A-REGISTER. |
| | | TMP | DESIGNATE TMP-REGISTER. |
| | | OPR | DESIGNATE OPERAND REGISTER. |
| | | PS | DESIGNATE REGISTER POINTER. |
| | | R (PS) | INDIRECTLY DESIGNATE BY REGISTER POINTER. |
| OPERATION INSTRUCTION | | OPE 1 | OPERATION-1  REMARKS: ONE OPERATION IS COMPLETED WITH THREE INSTRUCTIONS. OPERATION IS EXECUTED FOR A-REGISTER AND RESULT IS OUTPUTTED TO A-REGISTER. |
| | | OPE 2 | OPERATION-2 |
| | | OPE 3 | OPERATION-3 |
| | | NORM | NORMALIZE A-REGISTER AND RETURN TO A-REGISTER. |
| CONTROL INSTRUCTION | | JMP | BRANCH TO ADDRESS DESIGNATED WHEN CONDITION IS TRUE. FORMAT: JMP (CONDITION, BRANCH DESTINATION ADDRESS) |
| | | CALL | WHEN CONDITION IS TRUE, SAVE CURRENT VALUE OF MICROPROGRAM POINTER TO MICROADDRESS STACK, AND BRANCH TO DESIGNATED ADDRESS. FORMAT: CALL (CONDITION, BRANCH DESTINATION ADDRESS) |
| | | RET | RETURN TO MICROADDRESS SAVED IN MICROADDRESS STACK. FORMAT: RET |
| | | END | END MICROPROGRAM |
| | BRANCH CONDITION IN CASE OF BRANCH INSTRUCTION | DEN | TRUE WHEN A-REGISTER IS UNNORMALIZED NUMBER |

FORMAT OF MICROINSTRUCTION:
  [TRANSFER DESIGNATION REGISTER] = [ TRANSFER SOURCE REGISTER ];
                                    [ OPERATION INSTRUCTION ];
                                    [ CONTROL INSTRUCTION ];
  HOWEVER, NOTHING IS DONE IN CASE OF FIELD HAVING NO DESCRIPTION OTHER THAN ";"

FIGURE 6    PRIOR ART

| MAIN ROUTINE | | | | |
|---|---|---|---|---|
| FIRST LINE : | START : | AREG = OPR ; | ; | ; |
| SECOND LINE : | | ; | ; | CALL (DEN, NORMAL) ; |
| THIRD LINE : | | ; | OPE 1 ; | ; |
| FOURTH LINE : | | ; | OPE 2 ; | ; |
| FIFTH LINE : | | ; | OPE 3 ; | ; |
| SIXTH LINE : | | OPR = AREG ; | ; | END; |
| NORMALIZING SUBROUTINE | | | | |
| FIRST LINE : | NORMAL : | ; | NORM ; | RET ; |

FIGURE 9

| MAIN ROUTINE | | | | |
|---|---|---|---|---|
| FIRST LINE : | START : | AREG = R (PS) ; | OPE 1 ; | ; |
| SECOND LINE : | | ; | OPE 2 ; | JMP (DEN, NORMAL) ; |
| THIRD LINE : | | ; | OPE 3 ; | ; |
| FOURTH LINE : | | OPR = AREG ; | ; | END; |

| NORMALIZING SUBROUTINE | | | | |
|---|---|---|---|---|
| FIRST LINE : | NORMAL : | PS = # n ; | NORM ; | ; |
| SECOND LINE : | | TMP = AREG ; | ; | RET ; |

REMARK : # n = TRANSFER SOURCE REGISTER DESIGNATION CODE
INDICATIVE OF TEMPORARY REGISTER

FIGURE 12 PRIOR ART

| KIND OF INSTRUCTIONS (CLASSIFIED BY FIELDS) | MNEMONIC | CONTENT |
|---|---|---|
| TRANSFER INSTRUCTION (DESIGNATION OF REGISTER) | AREG<br>BREG<br>CREG<br>DREG<br>RREG<br>SOPR<br>DOPR<br>PS<br>PD<br>R (PS)<br>R (PD) | DESIGNATE A-REGISTER.<br>DESIGNATE B-REGISTER.<br>DESIGNATE C-REGISTER.<br>DESIGNATE D-REGISTER.<br>DESIGNATE R-REGISTER.<br>DESIGNATE OPERAND REGISTER S.<br>DESIGNATE OPERAND REGISTER D.<br>DESIGNATE REGISTER POINTER S.<br>DESIGNATE REGISTER POINTER D.<br>INDIRECTLY DESIGNATE BY REGISTER POINTER S.<br>INDIRECTLY DESIGNATE BY REGISTER POINTER D. |
| OPERATION INSTRUCTION | DOP 1<br>DOP 2<br>DOP 3<br>NORMA<br>NORMB | OPERATION-1  REMARKS:<br>OPERATION-2    ONE OPERATION IS COMPLETED WITH THREE<br>OPERATION-3    INSTRUCTIONS.<br>NORMALIZE A-REGISTER AND RETURN TO R-REGISTER.<br>NORMALIZE B-REGISTER AND RETURN TO R-REGISTER. |
| CONTROL INSTRUCTION | JMP | BRANCH TO ADDRESS DESIGNATED WHEN CONDITION IS TRUE.<br>FORMAT: JMP (CONDITION, BRANCH DESTINATION ADDRESS) |
| | CALL | WHEN CONDITION IS TRUE, SAVE CURRENT VALUE OF MICROPROGRAM POINTER TO MICROADDRESS STACK, AND BRANCH TO DESIGNATED ADDRESS.<br>FORMAT: CALL (CONDITION, BRANCH DESTINATION ADDRESS) |
| | RET | RETURN TO MICROADDRESS SAVED IN MICROADDRESS STACK.<br>FORMAT: RET |
| | END | END MICROPROGRAM |
| BRANCH CONDITION IN CASE OF BRANCH INSTRUCTION | DENA | TRUE WHEN A-REGISTER IS UNNORMALIZED NUMBER |
| | DENB | TRUE WHEN B-REGISTER IS UNNORMALIZED NUMBER |

FORMAT OF MICROINSTRUCTION:
  [ TRANSFER DESIGNATION REGISTER ] = [ TRANSFER SOURCE REGISTER ];
                                      [ OPERATION INSTRUCTION ];
                                      [ CONTROL INSTRUCTION ];
  HOWEVER, NOTHING IS DONE IN CASE OF FIELD HAVING NO DESCRIPTION OTHER THAN ";"

FIGURE 13   PRIOR ART

| MAIN ROUTINE | | | | |
|---|---|---|---|---|
| FIRST LINE : | START : | AREG = DOPR ; | ; | ; |
| SECOND LINE : | | BREG = SOPR ; | ; | CALL (DENA, NORMA) ; |
| THIRD LINE : | | ; | ; | CALL (DENB, NORMB) ; |
| FOURTH LINE : | | ; | DOP 1 ; | ; |
| FIFTH LINE : | | ; | DOP 2 ; | ; |
| SIXTH LINE : | | ; | DOP 3 ; | ; |
| SEVENTH LINE : | | DOPR = RREG ; | ; | END; |

| NORMALIZING SUBROUTINE | | | | |
|---|---|---|---|---|
| FIRST LINE : | NORMA : | ; | NORMA ; | ; |
| SECOND LINE : | | AREG = RREG ; | ; | RET ; |
| THIRD LINE : | NORMB : | ; | NORMB ; | ; |
| FOURTH LINE : | | BREG = RREG ; | ; | RET ; |

FIGURE 15

| MAIN ROUTINE | | | | |
|---|---|---|---|---|
| FIRST LINE : | START : | AREG = R (PD) ; | ; | ; |
| SECOND LINE : | | BREG = R (PS) ; | DOP 1 ; | JMP (DENA, NORMAB) ; |
| THIRD LINE : | | ; | DOP 2 ; | JMP (DENB, NORMB) ; |
| FOURTH LINE : | | ; | DOP 3 ; | ; |
| FIFTH LINE : | | DOPR = RREG ; | ; | END ; |

| NORMALIZING SUBROUTINE | | | | |
|---|---|---|---|---|
| FIRST LINE : | NORMAB : | PD = # c ; | NORMA ; | ; |
| SECOND LINE : | | CREG = RREG ; | ; | ; |
| THIRD LINE : | NORMB : | PD = # d ; | NORMB ; | ; |
| FOURTH LINE : | | DREG = RREG ; | ; | RET ; |

REMARKS:

c = TRANSFER SOURCE REGISTER DESIGNATION CODE INDICATIVE C-REGISTER d = TRANSFER SOURCE REGISTER DESIGNATION CODE INDICATIVE D-REGISTER

NORMALIZATION CONTROL SYSTEM FOR FLOATING POINT ARITHMETIC OPERATION

BACKGROUND OF THE INVENTION

1. Field of the Invention

The present invention generally relates to a system design for large scaled integrated circuits, and more specifically to a microprogram controlled microprocessor capable of executing a floating point arithmetic operation.

2. Description of Related Art

Hitherto, in case of executing a floating point arithmetic operation, various kinds of standards which define a format of data, exception, etc. have been known. In the field of microprocessors, the floating point standard IEEE P754 defined by the IEEE has become a dominant standard. In this standard, as shown in FIG. 1A, a numerical value is represented in the form in which it is divided into an exponent and a mantissa in the normalized format, (so that the most significant bit of the mantissa is made "1"; According to the data format defined by the IEEE P754, the point in the mantissa is put between the most significant bit and the next more significant bit of the mantissa, so that the most significant bit of the mantissa becomes an integer bit of the mantissa, namely, indicates an integer portion of the mantissa).

As shown in FIG. 1B, in addition, a numerical value expressible in the standard floating point representation is within an extent of "1" to a value obtained by subtracting "1" from a maximum value of the exponent (when all bits of the exponent are "1"). Data expressed when all bits of the exponent are "1" is defined to indicate a special condition different from a numerical value, for example, infinity or negation. On the other hand, data when all bits of the exponent are zero is used to indicate a very small numerical value which is larger than "0" but smaller than a minimum numerical number expressible in the normalized number (when the exponent indicates "1" and only the integer bit of the mantissa is "1" and the other bits of the mantissa are "0") ("denormal number").

In the case of designing a microprocessor which executes the floating point arithmetic operation in the microprogram controlled manner, consideration must be paid to the case in which numerical values other than normalized numbers or signs are inputted. When data such as infinity other than numerical values is inputted, it is sufficient if the operation is branched to another routine as an exception processing, without performing a normalizing operation. However, if data such as a "denormal number", which is a numerical value but is not normalized, is inputted, it is, in some case, not possible to normalize the data without modification.

In this case, it is an ordinary manner that if an inputted source operand is an unnormalized number, the source operand is converted into a normalized number by using a subroutine for normalization, and thereafter, an arithmetic operation is executed.

In this manner, however, it is not possible to execute the arithmetic operation until it has been judged that the inputted source operand is a normalized number. In other words, the step number of microprograms must be increased because the unnormalized numbers may be inputted. As a result, the speed of the arithmetic operation for normalized numbers has been adversely made slow due to the unnormalized numbers which is generally considered to be very small in probability of input or appearance.

SUMMARY OF THE INVENTION

Accordingly, it is an object of the present invention to provide an normalization control system for a floating point arithmetic operation which has overcome the above mentioned defect of the conventional one.

Another object of the present invention is to provide an normalization control system for a microprogram controlled microprocessor which can execute a floating point arithmetic operation with a reduced number of microprogram steps.

The above and other objects of the present invention are achieved in accordance with the present invention by a microprogram controlled microprocessor capable of normalizing a given data in a floating point representation includes a memory storing a microprogram, an address register for holding a microprogram start address, an operand register for holding a source operand, a temporary register for temporarily holding an operation data, a pointer for holding a code indicative of the operand register at the time of starting the microprogram and for indicating a transfer source register in a transfer operation between internal registers, and a discriminator for discriminating whether or not an input source operand is a normalized number. The microprocessor operates on the basis of the microprogram to execute a given operation to the input source operand while causing the discriminator to discriminate whether or not the input source operand is a normalized number, so that the microprogram is completed without a branch when the input source operand is a normalized number. On the other hand, when the input source operand is an unnormalized number, the microprocessor operates to branch to a normalizing program and to cause a normalized operand to be held in the temporary register and a code indicative of the temporary register to be set to the pointer. In addition, the microprocessor operates to re-execute the microprogram from the address designated by the address register.

The above and other objects, features and advantages of the present invention will be apparent from the following description of preferred embodiments of the invention with reference to the accompanying drawings.

BRIEF DESCRIPTION OF THE DRAWINGS

FIG. 5 illustrates an example of a set of microinstructions;

FIG. 6 illustrates the flowchart shown in FIG. 4 in the form of a microprogram which uses the set of microinstructions shown in FIG. 5.

FIG. 9 illustrates the flowchart shown in FIG. 8 in the form of a microprogram by using the set of microinstructions shown in FIG. 5;

FIG. 12 illustrates an example of a set of microinstructions;

FIG. 13 shows a microprogram which realizes the flowchart shown in FIG. 11 by using a set of microinstructions shown in FIG. 12;

FIG. 15 illustrates the flowchart shown in FIG. 14 in the form of a microprogram by using the set of microinstructions shown in FIG. 12.

DESCRIPTION OF THE PREFERRED EMBODIMENTS

Figure 1A:
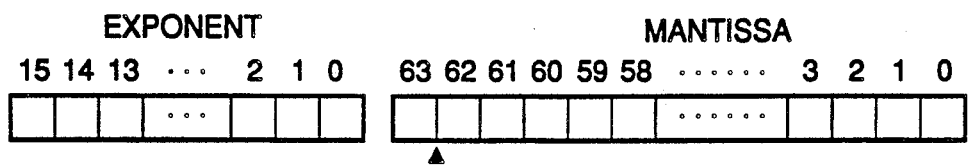
FIG. 1A illustrates a floating point representation.
Figure 1B:
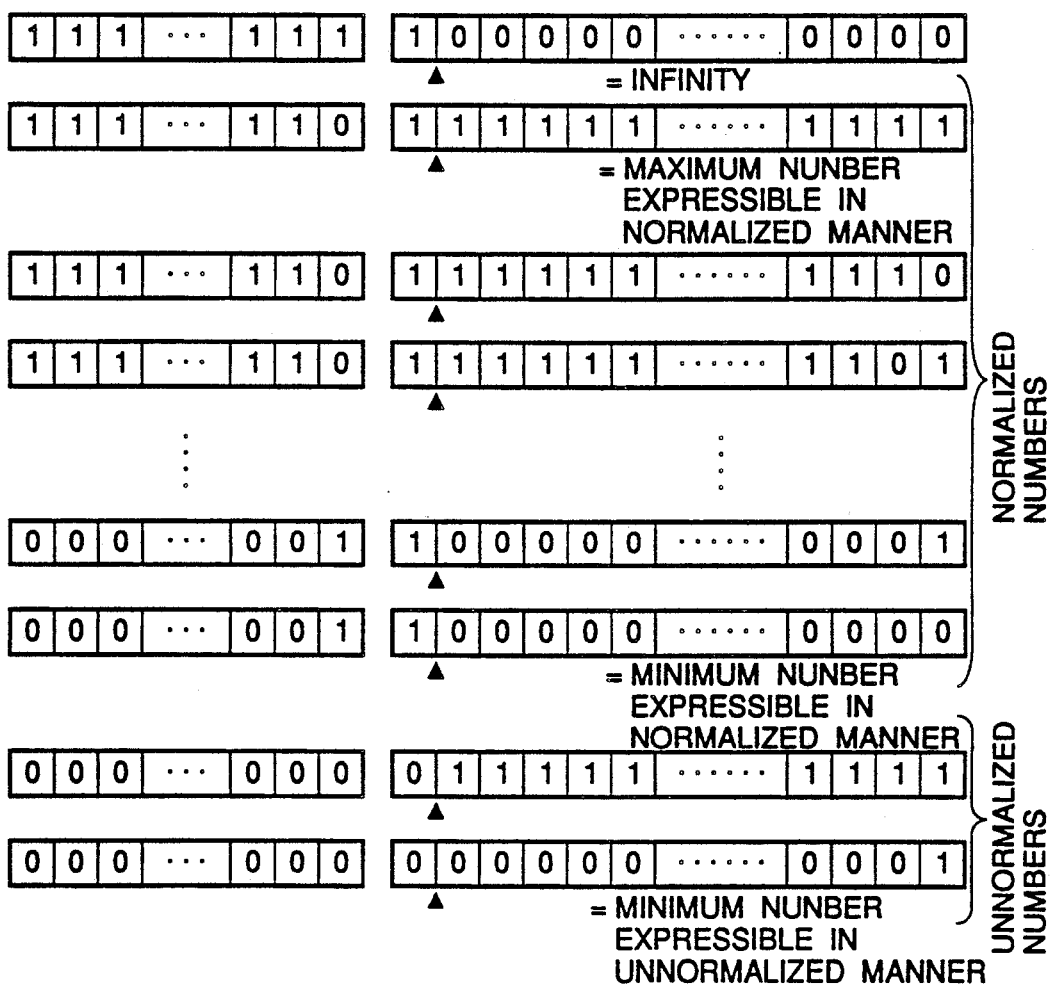
FIG. 1B illustrates various examples of normalized and unnormalized numbers in floating point representation.
Figure 2:
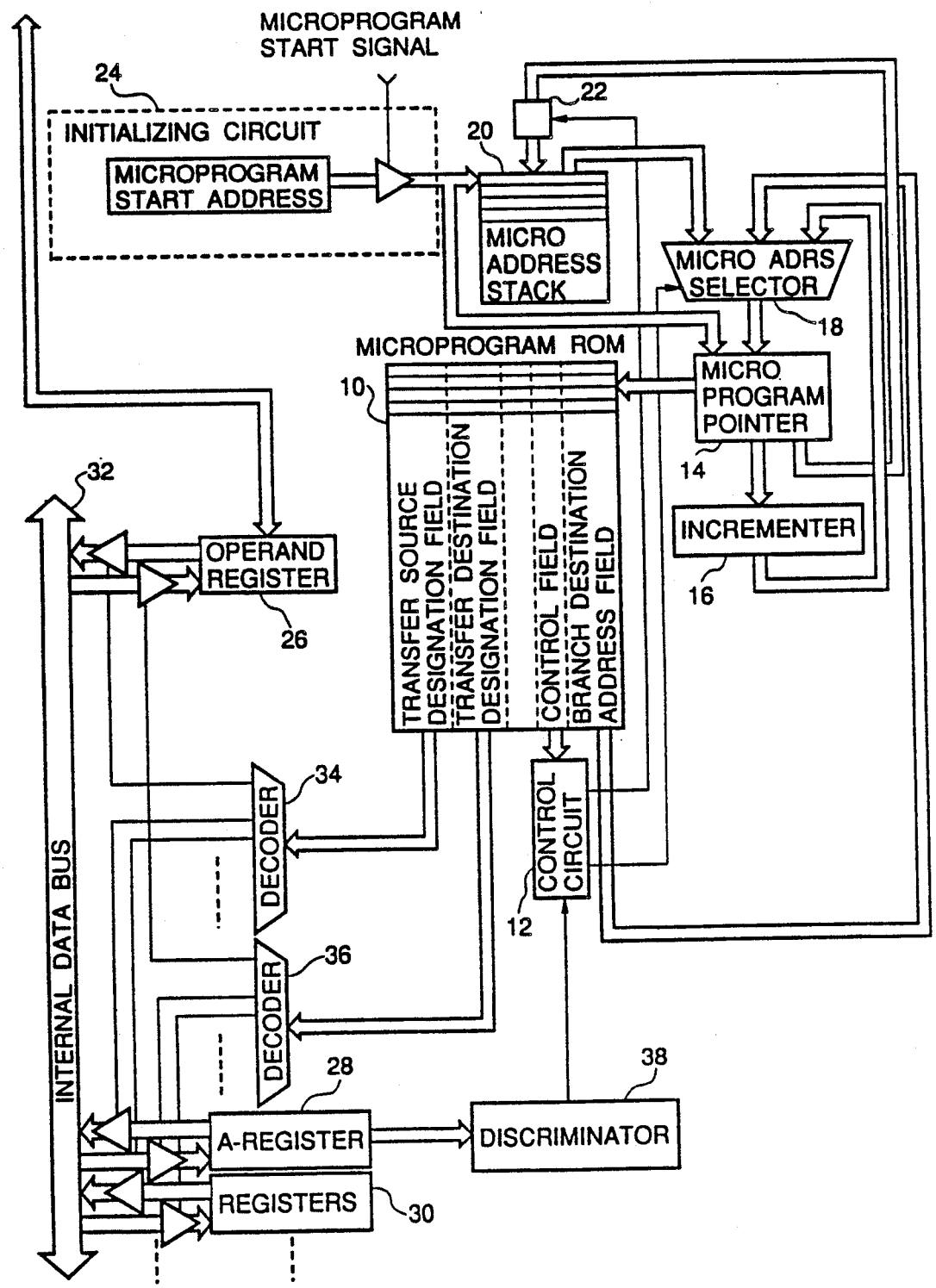
FIG. 2 is a block diagram of a microprogram sequencer and a circuit for microprogram transfer instructions, in one example of the conventional microprogram controlled microprocessor capable of executing the floating point arithmetic operation.

First, a microprogram used in the conventional microprogram controlled microprocessor capable of executing the floating point arithmetic operation will be explained. Referring to FIG. 2, there is shown a block diagram of a microprogram sequencer and a circuit for microprogram transfer instructions, in one example of the conventional microprogram controlled microprocessor capable of executing the floating point arithmetic operation.

The shown microprocessor includes a microprogram ROM (read only memory) 10 for storing microprograms, and a control circuit 12 associated with the microprogram ROM 10 for generating various control signals for different portions of the microprocessor, on the basis of a control field of the microinstruction read from the microprogram ROM 10. Fields of the microinstruction will be explained hereinafter. The microprocessor also includes an address pointer 14 for indicating an address for a microinstruction to be executed next to the ROM 10, and an incrementer 16 for receiving and incrementing a content of the address pointer 14 so that the microprogram is advanced. An output of the incrementer 16 is coupled to an microaddress selector 18 for selecting an microinstruction address to be inputted to the address pointer 14. To the selector 18, a microinstruction address stack 20 is also coupled, which makes it possible to execute a subroutine call/return instruction in the microprogram. This stack 20 is associated with a buffer 22 which is controlled by a control signal from the control circuit 12 so as to cause to store (or save) the content of the microprogram address pointer 14 to the stack 20 in the case that a microprogram is a subroutine call. Furthermore, there is provided an initializing circuit 24 which sets a microprogram start address to the microprogram address pointer 14 through a tristate which is rendered conductive in response to a microprogram start signal activated when execution of the microprogram should be started.

The microprocessor further includes an operand register 26 used for reading and writing a source operand/destination operand to devices external to the microprocessor, a A-register 28 for holding a data to be normally subjected to operation, and other internal registers 30. These registers are coupled to an internal data bus 32 through input and output buffers, respectively.

A transfer source register designation decoder 34 is coupled to receive a content of a transfer source register designation field of the microinstruction read from the microprogram ROM 10 for controlling the input and output tristate buffers associated with the registers 26, 28 and 30 so as to designate a transfer source register. In addition, a transfer destination register designation decoder 36 is coupled to receive a content of a transfer destination register designation field of the microinstruction read from the microprogram ROM 10 for controlling the input and output buffers associated to the registers so as to designate a transfer destination register. Furthermore, there is provided a discriminator 38 coupled to the A-register 28 for discriminating whether or not the content of the A-register 28 is an unnormalized number and for notifying the result of the discrimination to the control circuit 12.

Figure 3:
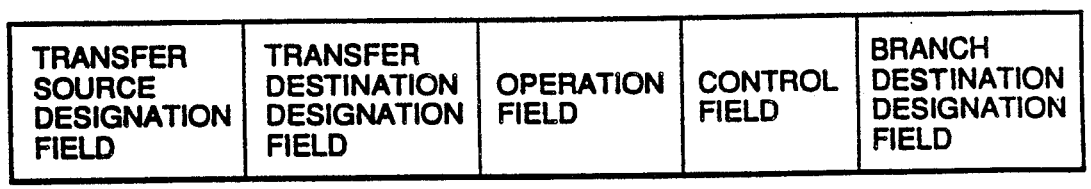
FIG. 3 illustrates a format of a microinstruction stored in the microprogram ROM shown in FIG. 2, which is composed of five fields including a transfer source register designation field, a transfer destination register designation field, an operation field, a control field and a branch destination address designation.

The microinstructions stored in the microprogram ROM 10 are in a format composed of five fields including a transfer source register designation field, a transfer destination register designation field, an operation field, a control field and a branch destination address designation field as shown in FIG. 3. The microinstruction can simultaneously designates three instructions of one transfer instruction, one operation instruction and one control instruction. However, if the three instructions are included in the same address, the control instruction and the operation instruction are executed after the execution of the transfer instruction has been executed. In addition, a conditional branch instruction is described in the control instruction, the condition of branch/unbranch is determined in accordance with the result of a microinstruction which had been executed before one instruction. Incidentally, execution of a step of microinstruction needs one clock.

Now, there will be explained a microprogram for normalizing an unnormalized number input and re-executing a given operation in the above mentioned microprocessor, and thereafter, problems will be described.

Figure 4:
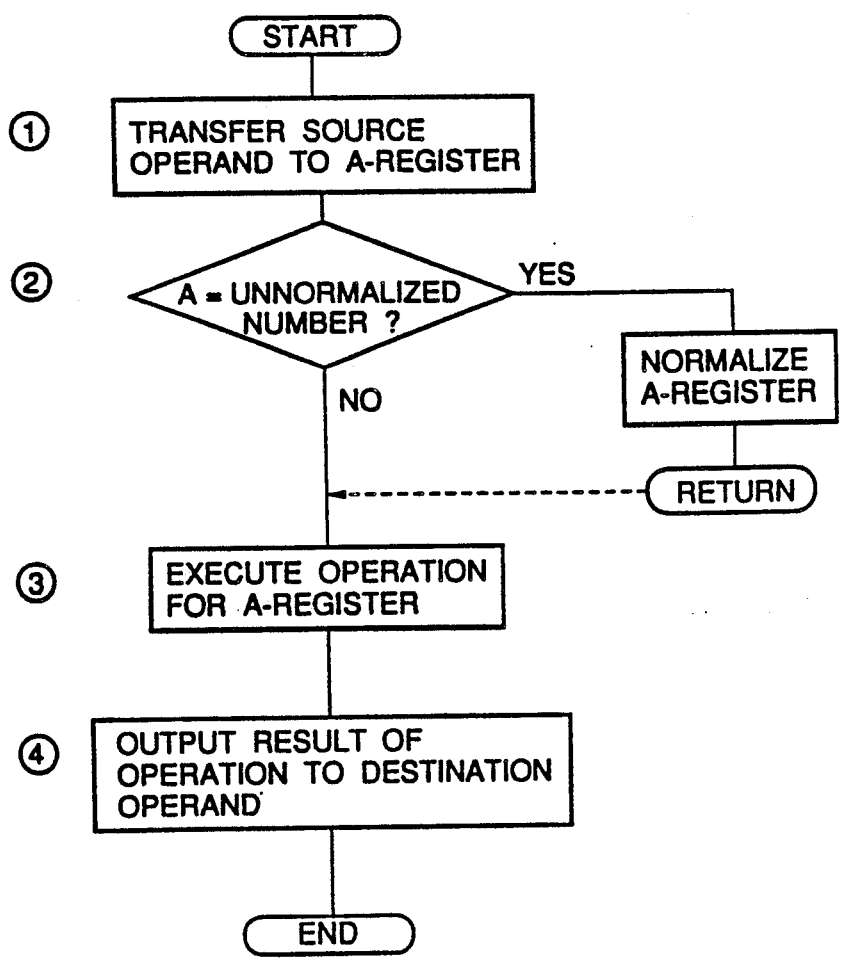
FIG. 4 is a flowchart of one example of the microprogram used in the microprocessor shown in FIG. 2.

Referring to FIG. 4, there is shown a flowchart of one example of the microprogram used in the above mentioned microprocessor.

As mentioned hereinbefore, since the A-register holds the data subjected to a given operation, an input source operand is transferred to the A-register 28 (step 1). Then, the content of the A-register 28 is discriminated by the discriminator 38, and if it is an unnormalized number, a subroutine for normalization is called (step 2). If the content of the A-register 28 is a normalized number, or after the content of the A-register 28 is normalized number if it was the unnormalized number, the given operation is executed for the content of the A-register 28 (step 3). The result of the operation is outputted from the A-register 28 to the destination operand (step 4).

FIG. 5 illustrates a set of microinstructions and FIG. 6 indicates the above mentioned flowchart in the form of a microprogram which uses the set of microinstructions shown in FIG. 5. Incidentally, assume that the operation in the step 3 of the flowchart can be executed by three operation instructions OPE1, OPE2 and OPE3.

As seen from the above, since the actual operation is executed with three steps, if it is assumed that the output of the result needs one clock, the execution time required for operation of the normalized number is only four clocks. However, if the input data is an unnormalized number, the execution of the operation must be waited until the unnormalized number has been normalized. As a result, even if the input data is a normalized number, the operation will need six clocks, and the main routine of the microprogram must be elongated to have six steps.

As will be apparent from the above, the conventional microprogram controlled microprocessor capable of executing the floating point arithmetic operation has been required to provide, at a head of a microprogram, a few steps which are used for rarely inputted unnormalized numbers but cannot be used for a normal arithmetic operation. As a result, the execution speed has inevitably been low, and the microprogram itself has been long.

Figure 7:
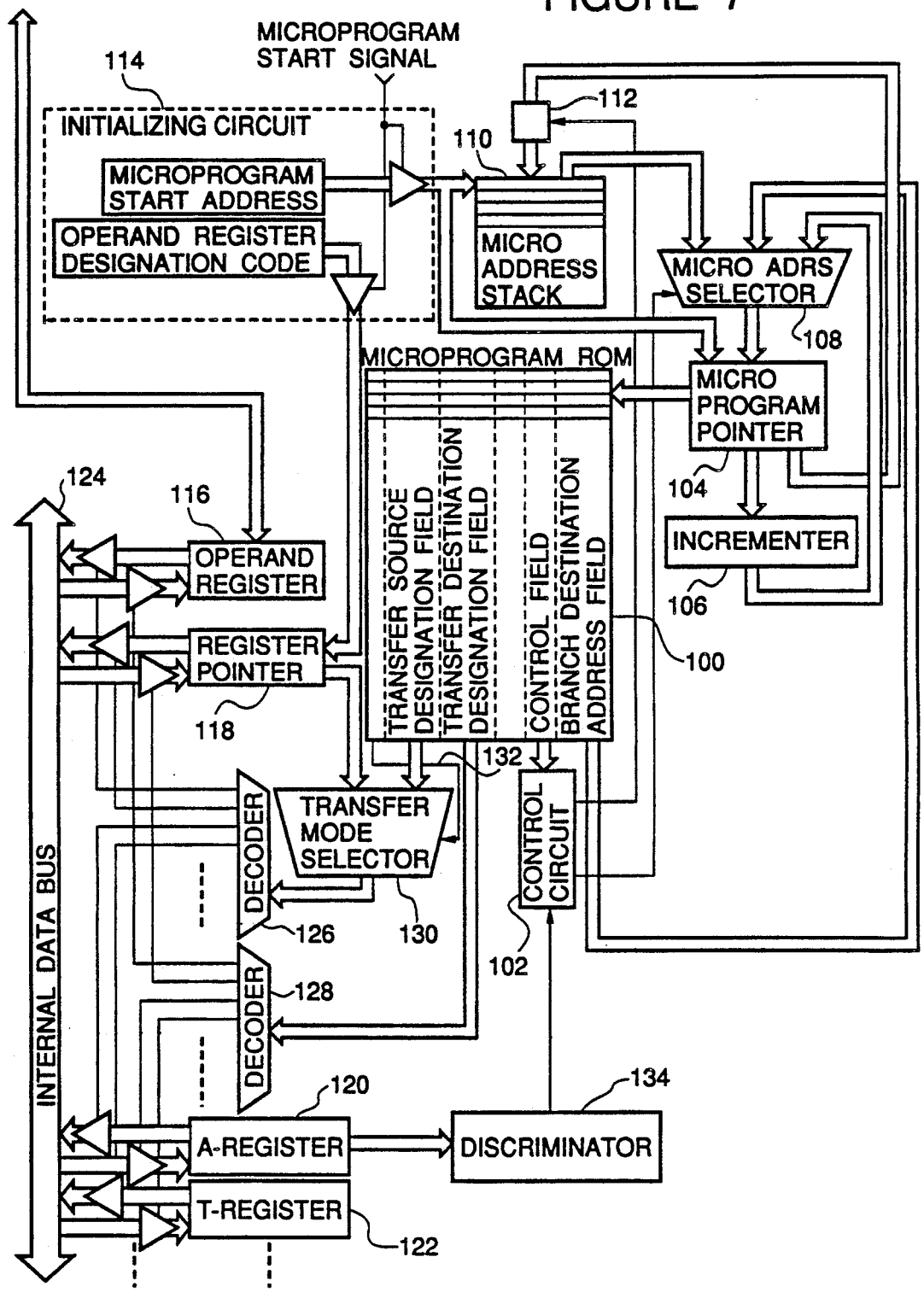
FIG. 7 is a block diagram of a first embodiment of the microprogram controlled microprocessor in accordance with the present invention capable of executing the floating point arithmetic operation.

Referring to FIG. 7, there is shown a block diagram of a first embodiment of the microprogram controlled microprocessor in accordance with the present invention capable of executing the floating point arithmetic operation.

The shown microprocessor includes a microprogram ROM (read only memory) 100 for storing microprograms, and a control circuit 102 associated with the microprogram ROM 100 for generating various control signals for different portions of the microprocessor, on the basis of a control field of an microinstruction read from the microprogram ROM 100. A field construction of the microinstruction, kinds of instructions and timing of execution are similar to those of the above mentioned microprocessor, and therefore, explanation thereof will be omitted.

The microprocessor also includes an microprogram address pointer 104 for indicating an address for a microinstruction to be executed next to the ROM 100, and an incrementer 106 for receiving and incrementing a content of the address pointer 104 so that the microprogram is advanced. An output of the incrementer 106 is coupled to an microaddress selector 108 which selects an microinstruction address to be inputted to the address pointer 104. This selector 108 is also coupled to a microinstruction address stack 110 which makes it possible to execute a subroutine call/return instruction in the microprogram. This stack 110 is associated with a buffer 112 which is controlled by a control signal from the control circuit 102 so as to cause to store (or save) the content of the microprogram address pointer 104 to the microinstruction address stack 110 in the case that a microprogram is a subroutine call.

Furthermore, there is provided an initializing circuit 114 which sets a microprogram start address to the microprogram address pointer 104 and the microinstruction address stack 110, respectively, through a tristate buffer which is rendered conductive in response to a microprogram start signal activated when execution of the microprogram should be started. The initalizing circuit 114 also sets a code indicative of an operand register 116 to a register pointer 118 through another tristate buffer rendered conductive in response to the active microprogram start signal.

The operand register 116 is used for reading and writing a source operand/destination operand to devices external to the microprocessor, and the register pointer 118 is used for holding a code indicative of a transfer source register when the transfer source register is indirectly designated. The microprocessor also includes a A-register 120 for holding a data to be normally subjected to operation, and a temporary registers 122 for temporarily storing data. The above mentioned registers 116 to 122 are coupled to an internal data bus 124 through input and output tristate buffers, respectively.

Furthermore, a transfer source register designation decoder 126 is coupled to receive through a transfer mode selector 130 a content of a transfer source register designation field of the microinstruction read from the microprogram ROM 100 for controlling the input and output tristate buffers associated with the registers 116 to 122 so as to designate a transfer source register. The transfer mode selector 130 has a first input connected to receive the content of the transfer source register designation field of the microinstruction read from the microprogram ROM 100 and a second input connected to an output of the register pointer 118. The transfer mode selector 130 is controlled by a direct transfer/indirect transfer selection signal 132 which indicates whether the internal transfer should be executed by a direct transfer mode or by an indirect transfer mode. Therefore, one of the transfer source register designation field of the read out microinstruction and the content of the register pointer 118 is selected by the selector 132 in accordance with the direct transfer/indirect transfer selection signal 132 and then outputted to the transfer source register designation decoder 126. The direct transfer/indirect transfer selection signal 132 is derived from the transfer source register designation field of the microinstruction read from the microprogram ROM 100.

In addition, a transfer destination register designation decoder 128 is coupled to receive a content of a transfer destination register designation field of the microinstruction read from the microprogram ROM 100 for controlling the input and output buffers associated with the registers so as to designate a transfer destination register. Furthermore, there is provided a discriminator 134 coupled to the A-register 120 for discriminating whether or not the content of the A-register 120 is an unnormalized number and for notifying the result of the discrimination to the control circuit 102.

As will be apparent from comparison between FIGS. 2 and 7, the microprocessor shown FIG. 7 is different from the microprocessor shown FIG. 2 in that (1) the microprocessor shown FIG. 7 has the register pointer 118, (2) the initializing circuit 114 of the microprocessor shown FIG. 7 has a function of initializing the register pointer 118, and (3) the microprocessor shown FIG. 7 has the transfer mode selector 130. These features of hardwares will make it possible to speed up the processing of the microprogram.

Now, operation of the shown microprocessor will be explained with reference to a flowchart of operation and an example of a microprogram.

Figure 8:
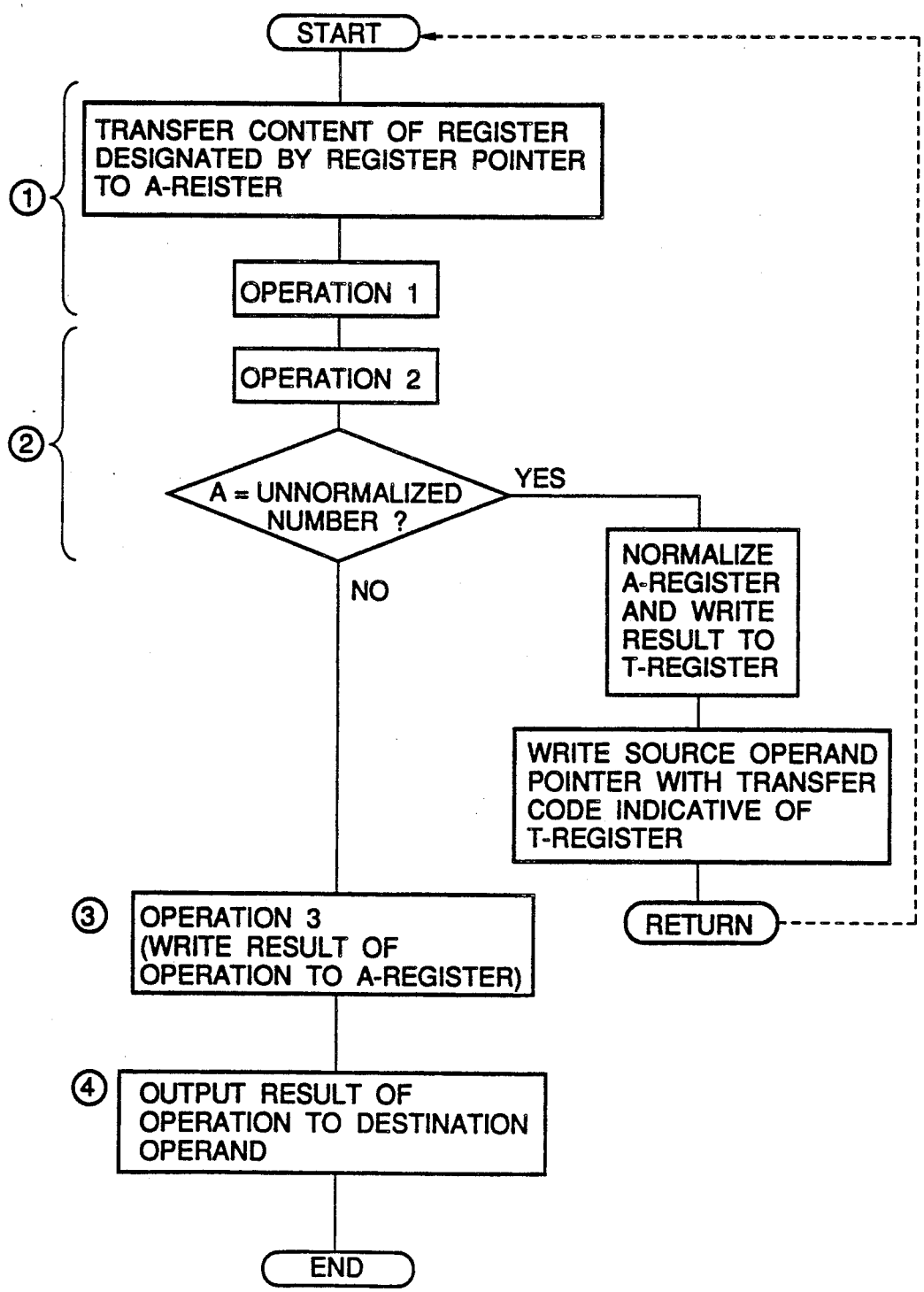
FIG. 8 is a flowchart of one example of the microprogram used in the microprocessor shown in FIG. 7.

Referring to FIG. 8, there is shown a flowchart of an operation which performs a pre-processing control system in accordance with the present invention.

The flowchart shown in FIG. 8 may be somewhat similar to that shown in FIG. 4, however, the actual operation is substantially different from that of the conventional microprocessor. As mentioned above, since the A-register 120 holds the data subjected to a given operation, the content of a register indirectly designated by the register pointer 118 is transferred to the A-register 28 and a first operation is executed (step 1). Thereafter, a second operation is executed, and the content of the A-register 120 is discriminated by the discriminator 134. If it is an unnormalized number, the operation is branched to a subroutine for normalization (step 2). If the content of the A-register 120 is a normalized number, a final operation is executed for the content of the A-register 120 (step 3). The result of the operation is outputted from the A-register 120 to the operand register 116 (step 4).

As would be apparent, the flowchart shown in FIG. 8 is different from that of FIG. 4 in the following four points: A first difference is that, when a source operand is transferred to the A-register 120 at the start of the microprogram, a transfer source register is designated by an indirect transfer. A second difference is that the operation is started without waiting the result of the discrimination about whether or not the source operand is a normalized number. A third difference is that, when the source operand is discriminated to be an unnormalized number, the operation is branched to the normalizing subroutine by use of a subroutine call in the conventional microprocessor, but is branched to the normalizing subroutine by use of an ordinary branch instruction in the microprocessor shown in FIG. 7 in accordance with the present invention. A fourth difference is that in the normalizing routine, the normalized result is not returned to the A-register 120 but saved to the temporary register 122, and a transfer code indicative of the temporary register 122 is set to the register pointer 118.

The above mentioned differences will give the following advantages, which will be explained with reference to FIG. 9 indicating the above mentioned flowchart in the form of a microprogram by using the set of microinstructions shown in FIG. 5. Incidentally, assume that the given can be executed by three operation instructions OPE1, OPE2 and OPE3, similarly to the conventional microprocessor.

First, at a first line of the main routine, a source operand is transferred to the A-register 120 by the indirect designation of the register pointer 118. Since the transfer code indicative of an operand register 116 is set to the register pointer 118 by the initializing circuit 114, the content of the operand register 116 is transferred to the A-register 120. At the same time, the operation instruction "OPE1" is executed. Namely, the arithmetic operation is started. Here, the arithmetic operation cannot generate a correct result unless the input operand is the normalized number. Therefore, if the input operand is the unnormalized number, the arithmetic operation is made invalid.

At a second line of the main routine, the value inputted in the A-register 120 is discriminated by the discriminator 134. If it is the unnormalized number, it goes to the normalizing subroutine by a jump instruction. Even at this second line, the operation instruction "OPE2" is executed.

After the second line of the main routine, the operation is divided into two in accordance with the input operand. First, operation in the case of the unnormalized number will be explained.

If the input operand is the unnormalized number, the operation is branched from the second line of the main routine to a first line of the normalizing subroutine. With a transfer instruction included in the first line of the normalizing subroutine, a transfer source register destination code indicative of the temporary register 112 is set to the register pointer 118. At the same time, the operation "NORM" is executed by the operation instruction so that the content of the A-register 120 is normalized. Here, the given arithmetic operation will not be completed unless all the three operations "OPE1", "OPE2" and "OPE3" have been executed. Therefore, the fact that the operation "NORM" is executed without executing the operation "OPE3", means that the arithmetic operation for the unnormalized number which should have been invalid is interrupted.

At a second line of the normalizing subroutine, the normalized content of the A-register 120 is saved in the temporary register 122, and a return instruction is executed.

The above subroutine is branched from the second line from the main routine by the jump instruction, not by a subroutine call, and therefore, in the conventional microprocessor, it is not possible to execute the return instruction since the return address is not known. In the microprocessor in accordance with the present invention, however, since the microprogram start address is stored in the microaddress stack 110 by the initializing circuit 114 at the time of starting the microprogram execution, it is possible to return to the microprogram start address by the return instruction.

The following is a reason for adding the above mentioned initialing hardware and then for returning by the return instruction, without using an ordinary branch instruction, in order to return to the starting address fo the microprogram. In general, the floating point arithmetic processors are such that one normalizing subroutine is called by many main routines so that data is normalized before a given operation. Therefore, an address to be returned after completion of the normalizing subroutine cannot be known, other than the fact that it should be the start address of each microprogram. Particularly, an absolute address to be returned is not sure.

The execution of the operation is re-started from the first line of the main routine, and the data is transferred once again to the A-register 120 by means of the indirect designation of the register pointer 118. At this time, since the code designating the temporary register 122 has been set to the register pointer 118 in the first line of the normalizing subroutine, the content of the temporary register 122 is transferred to the A-register 120. This input content of the A-register is the normalized source operand, and therefore, the succeeding operation will be performed similarly to an ordinary operation for a normalized source operand.

Next, an operation after the second line of the main routine in the case that the input source operand is a normalized number will be explained.

Since the input source operand is a normalized number, a branch is not performed in the conditional branch instruction of the second line of the main routine, and a third line of the main routine will be executed. In the third line of the main routine, the operation instruction "OPE3" is executed, and the given arithmetic operation has been completed.

At a fourth line of the main routine, the operation result of the A-register 120 is transferred to the operand register 116, and the microprogram is terminated with the control instruction "END".

As mentioned above, the microprogram is executed from its head, regardless of whether or not the input operand is a normalized number, and in the way of the operation execution, if it is discriminated that the input operand is an unnormalized number, the input operand is normalized, and thereafter, the microprogram is again executed from its head. In this operation sequence, if the input operand is not the unnormalized number, the microprogram can be executed with a required minimum execution time (in this case, four clocks in total since the arithmetic operation needs three clocks and the output of the result needs one clock).

In addition, since there is not required a step for waiting the result of the discrimination of the input operand without executing the arithmetic operation, the size of the microprogram can be shortened in comparison with the conventional microprogram.

The embodiment just explained have been directed to a monadic operation. However, the present invention can be applied to a dyadic operation so that the dyadic operation execution time and a microprogram for the dyadic operation can be shortened, similarly to the case of the monadic operation.

Figure 10:
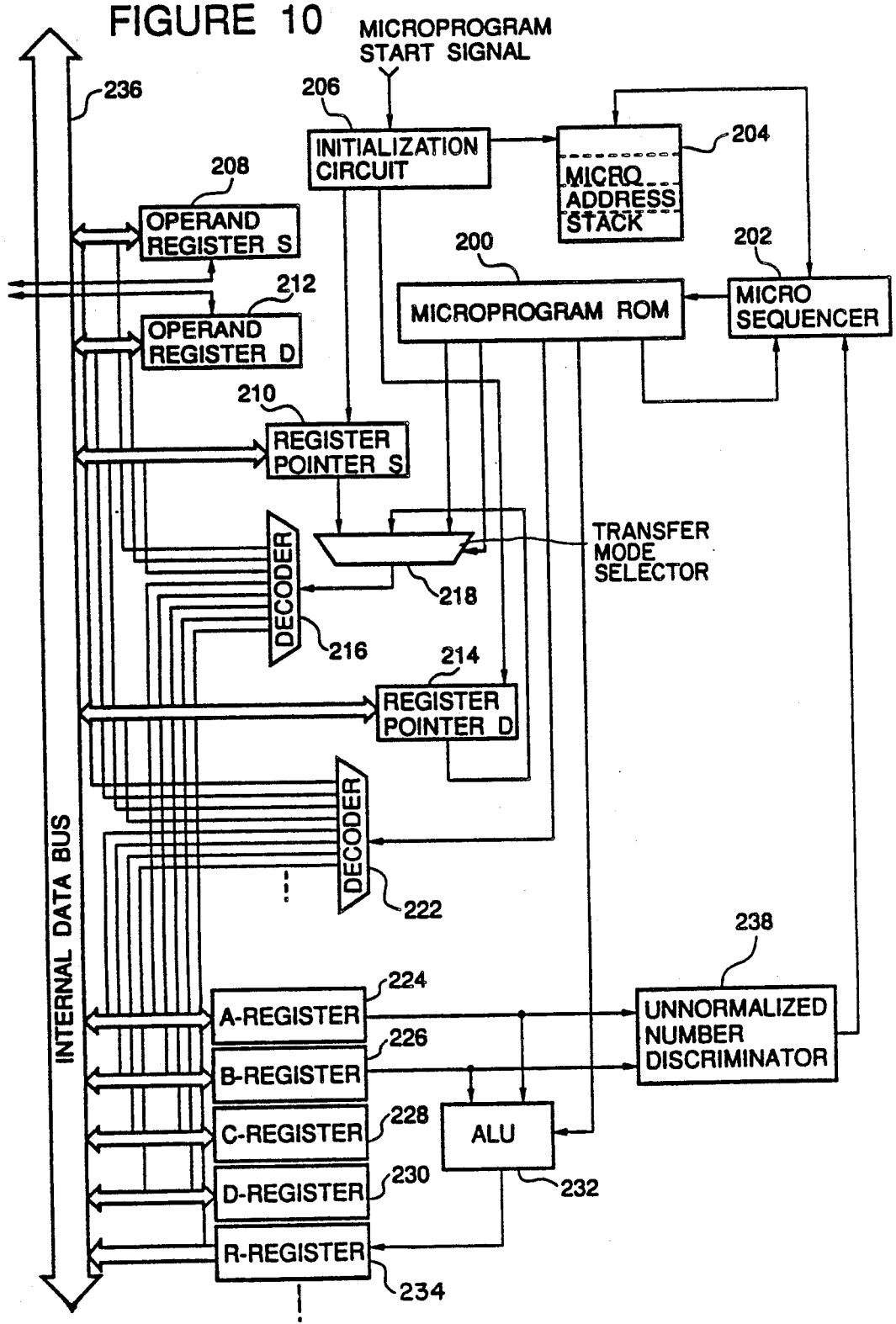
FIG. 10 is a block diagram of a second embodiment of the microprogram controlled microprocessor in accordance with the present invention capable of executing the dyadic operation.

Referring to FIG. 10, there is shown a block diagram of the microprocessor capable of executing the dyadic operation, which embodies the present invention.

The shown microprocessor includes a microprogram ROM (read only memory) 200, a microprogram sequencer 202 and a microinstruction address stack 204. The microprogram sequencer 202 is composed of a microprogram pointer, an incrementer, a microaddress selector and a control circuit, similarly to the embodiment shown in FIG. 7, and therefore, detailed explanation thereof will be omitted.

Furthermore, there is provided an initializing circuit 206 which responds to microprogram start signal so as to set a microprogram start address to a stack top of the microinstruction address stack 204 when execution of the microprogram should be started. The initializing circuit 206 also sets a code indicative of an operand register S 208 to a register pointer S 210 in response to the active microprogram start signal. In addition, the initializing circuit 114 also sets a code indicative of an operand register D 212 to a register pointer D 214 in response to the active microprogram start signal. The operand register S 208 is used to hold a first source operand inputted, and the operand register D 212 is used to hold a second source operand inputted and to output a destination operand after a given arithmetic operation.

Furthermore, a transfer source register designation decoder 216 operates to receive a transfer source register designation code through a transfer mode selector 218 and to determine a transfer source register. The transfer mode selector 218 has a first input connected to receive the content of the transfer source register designation field of the microinstruction read from the microprogram ROM 200, and a second input connected to an output of the register pointer S 210 and a third input connected to an output of the register pointer D 214. The transfer mode selector 218 is controlled by a transfer mode selection signal 220 which indicates whether a direct transfer should be executed in accordance with a transfer source register included in the transfer instruction, or the transfer should be executed by an indirect transfer mode using the register pointer S 210 or by by an indirect transfer mode using the register pointer D 214. Therefore, one of the above mentioned three transfer source register designation codes is selected by the selector 218 in accordance with the transfer mode selection signal 220 and then outputted to the transfer source register designation decoder 216. The transfer mode selection signal 220 is derived from the transfer source register designation field of the microinstruction read from the microprogram ROM 200.

In addition, a transfer destination register designation decoder 222 is coupled to receive a transfer destination register designation code and to designate a transfer destination register.

Furthermore, the microprocessor includes a A-register 224 for holding a first data to be normally subjected to operation, a B-register 226 for holding a second data to be normally subjected to operation, a C-register 228, and a D-register 230. The A-register 224 and the B-register 226 are coupled to two inputs of an arithmetic logic unit (ALU) 232, respectively, which operates to execute a normalizing operation, an arithmetic operation, etc, designated by the operation filed of the microinstruction. A result of the operation is outputted to a R-register 234. The above mentioned registers and register pointers are coupled to an internal bus 236, and the output and input of these registers and register pointers are controlled by the decoders, 216 and 222.

Furthermore, a discriminator 238 coupled to the A-register 228 and the B-register 226 for discriminating whether or not the contents of these registers are an unnormalized number and for notifying the result of the discrimination to the microsequencer 202.

Figure 11:
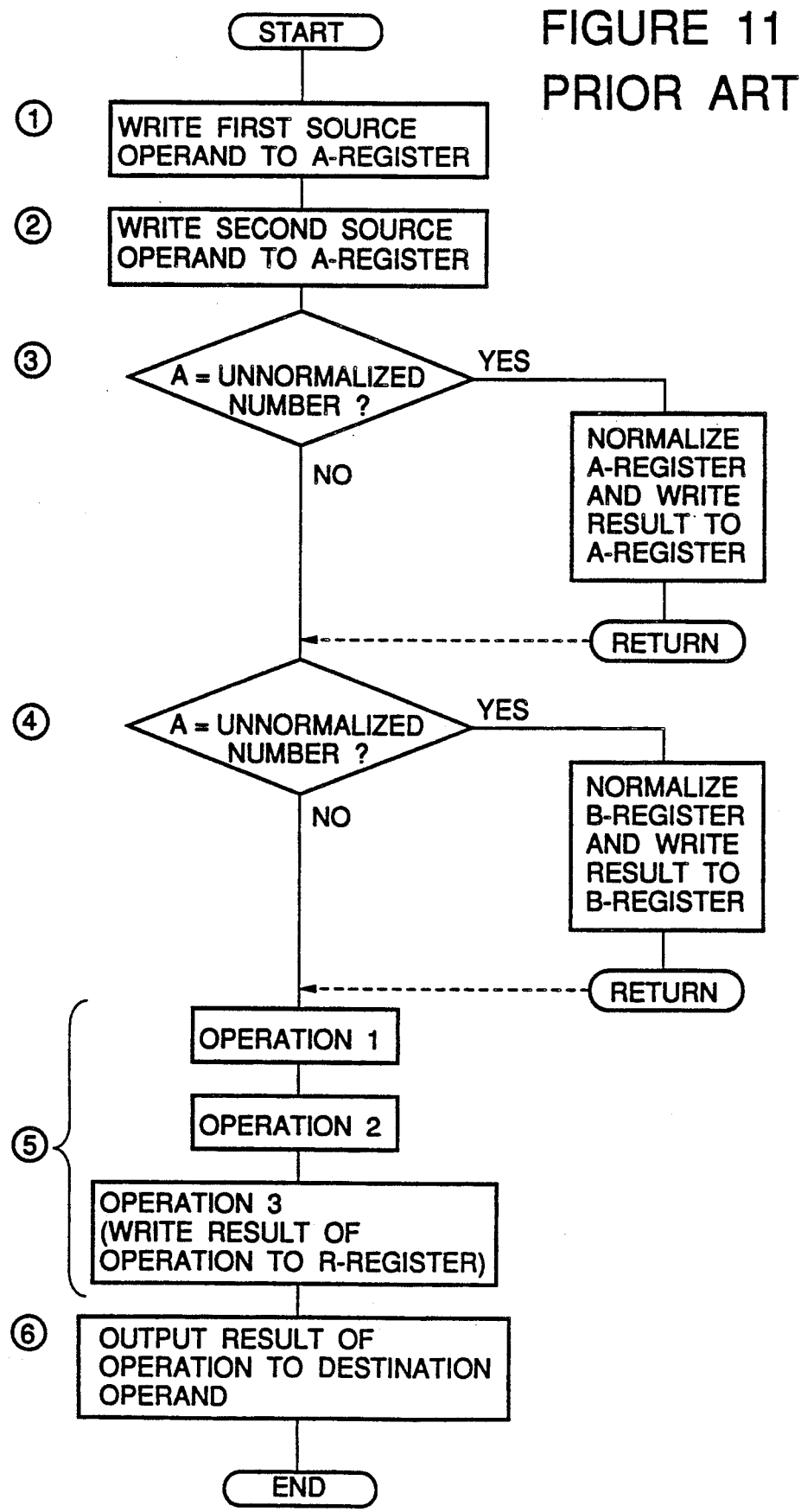
FIG. 11 is a flowchart illustrating a conventional method for a dyadic operation, without using the indirect transfer and the initializing circuit in accordance with the present invention.

Referring to FIG. 11, there is shown a flowchart illustrating a conventional method for a dyadic operation, without using the indirect transfer and the initializing circuit in accordance with the present invention.

Namely, a first source operand is inputted to the A-register 224 (step 1).

A second source operand is inputted to the B-register 226 (step 2).

If the content of the A-register 224 is an unnormalized number, a subroutine for normalizing the content of the A-register 224 is called, so that the content of the A-register 224 is normalized (step 3).

If the content of the B-register 226 is an unnormalized number, a subroutine for normalizing the content of the B-register 226 is called, so that the content of the B-register 226 is normalized (step 4).

A given (dyadic) operation is executed for the normalized contents of the A-register 224 and the B-register 226 (step 5).

The result of the operation is outputted to the destination operand (step 6).

Turning to FIG. 13, there is shown a microprogram which realizes the flowchart shown in FIG. 11 by using a set of microinstructions shown in FIG. 12.

At a first line of the main routine, the first source operand is transferred from the operand register D 212 to the A-register 224, and at a second line of the main routine, the second source operand is transferred from the operand register S 208 to the B-register 226. At the same time, whether the content of the A-register 224 is a normalized number or an unnormalized number is discriminated, and if necessary, a normalizing subroutine "NORMA" is called. If the content of the A-register 224 is the unnormalized number, after it is normalized by the normalizing subroutine "NORMA", the normalized number is returned to the A-register 224, and then, the operation goes to the third line of the main routine. At this stage, the A-register 224 surely holds the first source operand in the form of a normalized number.

At the third line of the main routine, whether or not the content of the B-register 226 transferred in the second line of the main routine is a normalized number. If the content of the B-register 226 is the unnormalized number, a normalizing subroutine "NORMB" is called. Then, after the content of the B-register 226 is normalized by the normalizing subroutine "NORMB", the normalized number is returned to the B-register 226.

At this stage, the A-register 224 and the B-register 226 surely hold the first and second source operandi in the form of a normalized number, respectively. This is a first time at which it has become possible to execute the given arithmetic operation.

In fourth to sixth lines of the main routine, the operation instructions "DOP1", "DOP2" and "DOP3" are executed with three steps (assuming that the given operation needs three steps, similarly to the first embodiment). The result of the operation is transferred from the R-register 234 to the operand register D 214 so that it is outputted to the destination operand.

As seen from the above, in the conventional method, until it has been ensured that both of source operandi are a normalized number, it is not possible to start the given arithmetic operation. Therefore, three extra steps are required at an initial portion of the microprogram.

Figure 14:
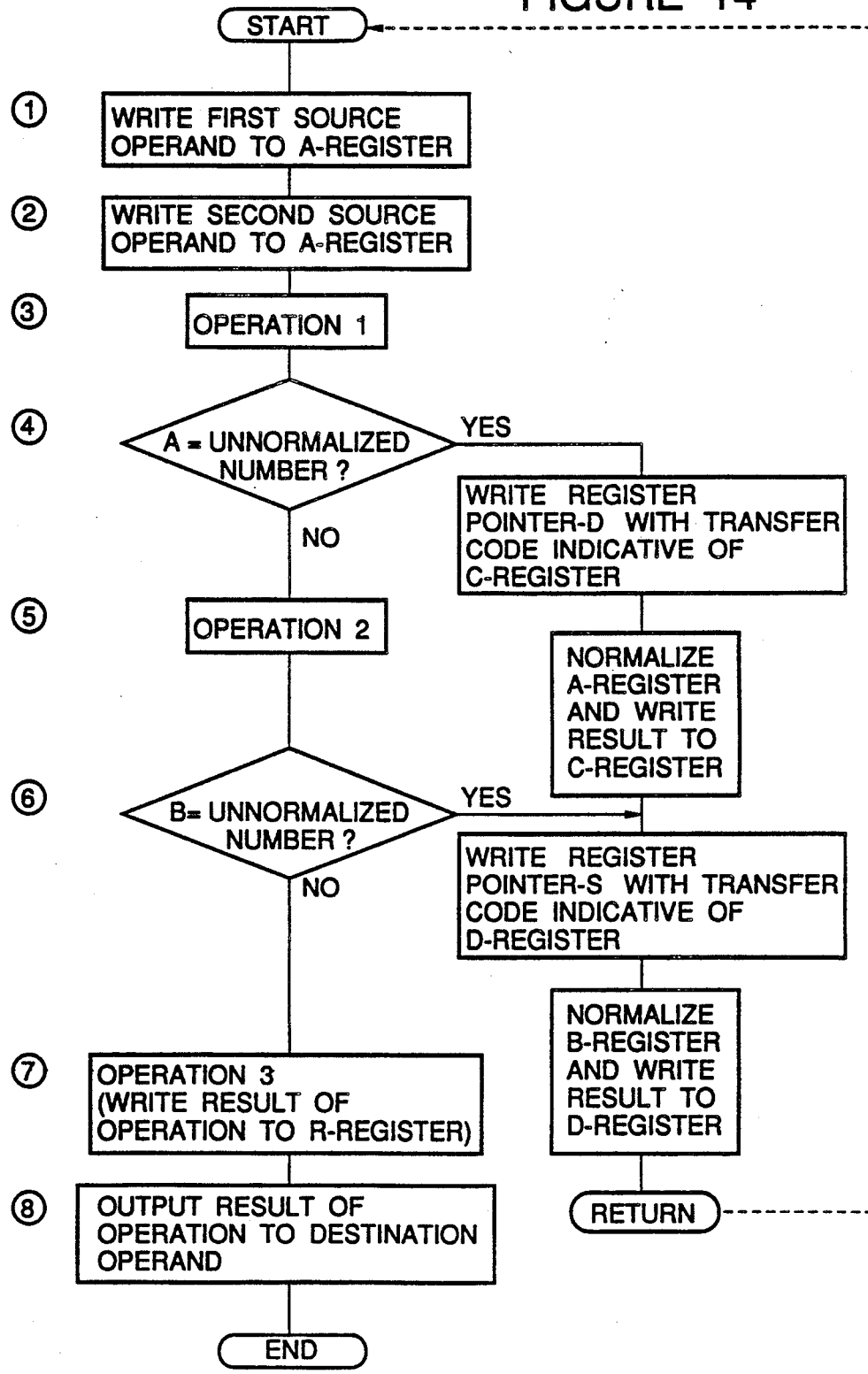
FIG. 14 is a flowchart of one example of the microprogram used in the microprocessor shown in FIG. 10 for preforming the dyadic operation.

Turning to FIG. 14, there is shown a flowchart of one example of the microprogram used in the microprocessor shown in FIG. 10 for preforming the dyadic operation.

Namely, a first source operand is inputted to the A-register 224 (step 1).

A second source operand is inputted to the B-register 226 (step 2).

A first step of the given arithmetic operation is executed (step 3).

If the content of the A-register 224 is an unnormalized number, the operation is branched to a subroutine for normalizing the content of the A-register 224 (step 4).

In this subroutine, the transfer source register designation code indicative of the C-register 228 is set to the register pointer D 214. Then, the content of the A-register 224 is normalized, and the result of the normalization is transferred to the C-register 228. Furthermore, the transfer source register designation code indicative of the D-register 230 is set to the register pointer S 210. Then, the content of the B-register 226 is normalized, and the result of the normalization is transferred to the D-register 230. Thereafter, the operation is returned to the head of the microprogram.

On the other hand, if the content of the A-register 224 is a normalized number, a second step of the given arithmetic operation is executed (step 5).

If the content of the B-register 226 is an unnormalized number, the operation is branched to a subroutine for normalizing the content of the B-register 226 (step 6).

In this subroutine, the transfer source register designation code indicative of the D-register 230 is set to the register pointer S 210. Then, the content of the B-register 226 is normalized, and the result of the normalization is transferred to the D-register 230. Thereafter, the operation is returned to the head of the microprogram.

On the other hand, if the content of the B-register 226 is a normalized number, a final step of the given arithmetic operation is executed (step 7).

The result of the given arithmetic operation is outputted to the destination operand (step 8).

Referring to FIG. 15, the flowchart shown in FIG. 14 in the form of a microprogram is illustrated by using the set of microinstructions shown in FIG. 12.

A flow of operation will change dependently upon whether or not the contents of the A-register 224 and the B-register 226 are a normalized number. Therefore, an operation in the case that both the contents of the A-register 224 and the B-register 226 are a normalized number will be explained.

At a first line of the main routine, a transfer to the A-register 224 is performed by the indirect designation of the register pointer D 214. Since the code indicative of the operand register D 212 has been set to the register pointer D 214 by the initializing circuit 206 at the time of starting the microprogram, the first source operand is transferred from the operand register D 212 to the A-register 224.

At a second line of the main routine, a transfer to the B-register 226 is performed by the indirect designation of the register pointer S 210. Similarly to the first line of the main routine since the code indicative of the operand register S 208 has been set to the register pointer S 210 by the initializing circuit 206 at the time of starting the microprogram, the second source operand is transferred from the operand register S 208 to the B-register 226.

At the same time, the operation instruction "DOP1" is executed. Namely, the given arithmetic operation is started. This given arithmetic operation will not be properly executed unless both of the two input operandi are a normalized number, similarly to the first embodiment. Therefore, if anyone of the two input operandi is an unnormalized number, the arithmetic operation is invalid. However, under this situation, since both of the two input operandi are a normalized number, there is no problem.

Furthermore, at the second line of the main routine, whether the content of the A-register 224 is a normalized number or an unnormalized number is discriminated, and if necessary, the operation is branched to the normalizing subroutine "NORMAB". But, in this case, since the content of the A-register 224 is the normalized number, a branch will not occur.

At a third line of the main routine, the operation instruction "DOP2" is executed to advance the execution of the given arithmetic operation, and at the same time, whether the content of the B-register 226 is a normalized number or an unnormalized number is discriminated. If the content of the B-register 226 is an unnormalized number, the operation is branched to the normalizing subroutine "NORMB". But, in this case, since the content of the B-register 226 is the normalized number, a branch will not occur.

At a fourth line of the main routine, the operation instruction "DOP3" is executed, and therefore, the execution of the given arithmetic operation is completed.

The result of the operation is transferred from the R-register 234 to the operand register D 212 so that it is outputted to the destination operand, in a fifth line of the main routine. With this, the microprogram is completed.

Next, the case in which the content of the A-register 224 is an unnormalized number will be explained. In this case, the same operation will be performed, regardless of whether the content of the B-register 226 is a normalized number or an unnormalized number.

At a first line of the main routine, the first source operand is transferred from the operand register D 212 to the A-register 224, by the indirect designation of the register pointer D 214.

At a second line of the main routine, the second source operand is transferred from the operand register S 208 to the B-register 226, by the indirect designation of the register pointer S 210.

At the same time, the operation instruction "DOP1" is executed. Namely, the given arithmetic operation is started. However, under this situation, since the content of the A-register 224 is an unnormalized number, the given arithmetic operation will be invalid.

Furthermore, at the second line of the main routine, whether the content of the A-register 224 is a normalized number or an unnormalized number is discriminated. Therefore, in this situation, the operation is branched to the normalizing subroutine "NORMAB" by a jump instruction (but not by a subroutine call).

At a first line of the normalizing subroutine, the code indicative of the C-register 228 is set to the register pointer D 214, and the content of the A-register 224 is normalized. Thereafter, at a second line of the normalizing subroutine, the result of the normalization is transferred to the C-register 228.

At a third line of the normalizing subroutine, the code indicative of the D-register 230 is set to the register pointer S 210, and the content of the B-register 226 is normalized. Thereafter, at a fourth line of the normalizing subroutine, the result of the normalization is transferred to the D-register 230, and the return instruction is executed. However, if the content of the B-register 226 is a normalized number, even the normalization is performed, the content of B-register 226 will not change, and will be transferred to the D-register 230 without being modified.

With the return instruction, the microprogram start address stacked in the microaddress stack 204 is read out, and the execution of operation will be returned to the first line of the main routine. Since the register pointers D 214 and S 210 have already been rewritten to indicate the C-register 228 and the D-register 230, respectively, the data (in the C-register) obtained by normalizing the original first source operand is transferred to the A-register 224 as a new first source operand, and the data (in the D-register) obtained by normalizing the original second source operand is transferred to the B-register 226 as a new second source operand. Under this condition, the microprogram will be re-executed.

The following is a reason for unconditionally normalizing the content of the B-register 226 in the case that the content of the A-register 224 is an unnormalized number, without dividing the operation into two dependently upon whether or not the content of the B-register 226 is a normalized number.

In the this embodiment, in the case that a source operand is an unnormalized number, the microprogram is re-started by using the microprogram start address previously stacked in the microaddress stack. Therefore, after the content of the A-register is normalized and the microprogram is re-started, even if the content of the B-register is normalized and the microprogram is re-started in the same manner, the microprogram start address stacked in the microaddress stack will no longer exist. Accordingly, the normalization and the re-starting are limited to one time.

Now, the case in which the content of the A-register 224 is a normalized number but the content of the B-register 226 is an unnormalized number will be explained.

The transfer operations executed in accordance with the first and second lines of the main routine are the same as the case in which the content of the A-register 224 is a normalized number. The execution of the operation instruction "DOP1" in accordance with the second line of the main routine will be invalid since the content of the B-register 226 is the unnormalized number. On the other hand, since the content of the A-register 224 is the normalized number, a branch will not occur.

At a third line of the main routine, the operation instruction "DOP2" is executed to advance the execution of the given arithmetic operation, and at the same time, whether the content of the B-register 226 is a normalized number or an unnormalized number is discriminated. However, under this situation, since the content of the B-register 226 is an unnormalized number, the operation is branched to the normalizing subroutine "NORMB" by a jump instruction (but not by a call instruction).

The normalizing subroutine "NORMB" is composed of a latter half of the normalizing subroutine "NORMAB", and therefore, includes the third and fourth line of the normalizing subroutine shown in FIG. 15.

At the third line of the normalizing subroutine, the code indicative of the D-register 230 is set to the register pointer S 210, and the content of the B-register 226 is normalized. Thereafter, at a fourth line of the normalizing subroutine, the result of the normalization is transferred to the D-register 230, and the return instruction is executed.

Since the register pointer S 210 has already been rewritten to indicate the D-register 230, the data (in the D-register) obtained by normalizing the original second source operand is transferred to the B-register 226 as a new second source operand. Under this condition, the microprogram will be re-executed.

As mentioned above, in the above mentioned second embodiment, if anyone of the input operandi is an unnormalized number, the unnormalized input operand is normalized, and thereafter, the microprogram is again executed from its head. Therefore, the operation execution time becomes inevitably long. However, if both of the input operandi are a normalized number, the microprogram can be executed with a required minimum execution time, in this case, five steps in total (since one step is needed for completion of the two operandi, three steps are required for the arithmetic operation and one step is needed for outputting the result).

The invention has thus been shown and described with reference to the specific embodiments. However, it should be noted that the present invention is in no way limited to the details of the illustrated structures but changes and modifications may be made within the scope of the appended claims.

I claim:

1. A microprogram controlled microprocessor capable of normalizing a given data in a floating point representation includes a memory storing a microprogram, an address register for holding a microprogram start address, an operand register for holding a source operand, a temporary register for temporarily holding an operation data, a pointer for holding a code indicative of the operand register at the time of starting the microprogram and for indicating a transfer source register in a transfer operation between internal registers, and a discriminator for discriminating whether or not an input source operand is a normalized number, the microprocessor operating on the basis of the microprogram to execute a given operation to the input source operand while causing the discriminator to discriminate whether or not the input source operand is a normalized number, so that the microprogram is completed without a branch when the input source operand is a normalized number, and the microprocessor also operating, when the input source operand is an unnormalized number, to branch to a normalizing program and to cause a normalized operand to be held in the temporary register and a code indicative of the temporary register to be set to the pointer, and then, the microprocessor operating to re-execute the microprogram from the address designated by the address register.

2. A microprocessor claimed in claim 1 further including a second operand register for holding a second source operand and a second temporary register for temporarily holding a second operation data, the microprocessor operating on the basis of the microprogram to execute a given operation to first and second input source operandi while causing the discriminator to discriminate whether or not at least one of the first and second input source operandi is a normalized number, so that the microprogram is completed without a branch when both of the input source operandi are a normalized number, and the microprocessor also operating, when one of the input source operandi is an unnormalized number, to branch to a normalizing program and to cause a normalized operand to be held in the temporary register and a code indicative of the temporary register to be set to the pointer, and then, the microprocessor operating to re-execute the microprogram from the address designated by the address register.

* * * * *